(12) United States Patent
Spohn

(10) Patent No.: US 6,524,671 B1
(45) Date of Patent: Feb. 25, 2003

(54) COEXTRUDED FLUOROPOLYMER/POLYAMIDE LAMINATE

(75) Inventor: Peter Dwight Spohn, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/041,323

(22) Filed: Mar. 12, 1998

Related U.S. Application Data

(63) Continuation of application No. 08/900,931, filed on Jul. 25, 1997, now abandoned.
(60) Provisional application No. 60/022,425, filed on Aug. 5, 1996, now abandoned.

(51) Int. Cl.[7] .......................... B32B 25/14; B32B 27/08; B32B 27/30; B32B 27/34
(52) U.S. Cl. .................... 428/35.7; 428/36.6; 428/36.7; 428/421; 428/422; 428/474.4; 428/474.9; 428/475.8; 428/476.3
(58) Field of Search ............... 428/35.7, 36.6, 428/36.7, 421, 422, 474.4, 474.9, 475.8, 476.3

(56) References Cited

U.S. PATENT DOCUMENTS

| | | | |
|---|---|---|---|
| 4,677,017 A | * 6/1987 | DeAntonis et al. | 428/214 |
| 5,472,784 A | 12/1995 | Rober et al. | 428/421 |
| 5,500,257 A | 3/1996 | Krause et al. | 427/487 |
| 5,500,263 A | 3/1996 | Rober et al. | 428/36.6 |
| 5,795,939 A | * 8/1998 | Lorek | 525/199 |
| 5,827,587 A | * 10/1998 | Fukushi | 428/36.6 |
| 6,090,459 A | * 7/2000 | Jadamus et al. | 428/36.4 |

FOREIGN PATENT DOCUMENTS

| | | | |
|---|---|---|---|
| EP | 0 626 424 A1 | 12/1993 | C08L/27/12 |
| EP | 0 650 987 A1 | 10/1994 | C08F/259/08 |
| EP | 0626424 A1 | * 11/1994 | |
| EP | 0 728 766 A1 | 6/1995 | C08F/214/18 |
| WO | WO 96/03448 | 2/1996 | C08F/259/08 |
| WO | WO 96/05965 | 2/1996 | B32B/27/28 |

OTHER PUBLICATIONS

Kirk–Othmer, Encyclopedia of Chemical Technology, 4th ed., vol. 19, p, 454 (1996).
Abstract, Database WPI, Section Ch, Week 9239, Derwent Publication Ltd., London, GB; AN 92–320278 XP002047645 and JP 04224939A (Tokai Rubber Ind Ltd), Aug. 14, 1992.

* cited by examiner

Primary Examiner—Sandra M. Nolan

(57) ABSTRACT

Coextruded layers of polyamide and fluoropolymer adhere to one another without an intervening tie layer by adhesive activation of polyamide of the polyamide layer, e.g. by incorporating into the polyamide layer a dispersed phase of maleic anhydride-grafted ethylene/propylene/diene copolymer. The fluoropolymer is a copolymer of ethylene with perhalogenated comonomer or a copolymer of tetrafluoroethylene with perfluorinated comonomer.

11 Claims, No Drawings

COEXTRUDED FLUOROPOLYMER/ POLYAMIDE LAMINATE

RELATED APPLICATIONS

This application is a continuation of application Ser. No. 08/900,931 filed Jul. 25, 1997, and now abandoned which in turn claims benefit of Provisional Application No. 60/022,425 filed Aug. 5, 1996 and now abandoned.

FIELD OF THE INVENTION

This invention relates to coextruded laminate structures in which one of the layers is fluoropolymer.

BACKGROUND OF THE INVENTION

U.S. Pat. No. 5,500,257 discloses the preparation of fluoropolymer composite tubing useful as automotive fuel line or hose, by first extruding a tubing of the fluoropolymer, then surface activating the outer surface of the fluoropolymer tubing by exposure to corona discharge or plasma, followed by extruding an outer layer of thermoplastic polymer onto the tubing. The fluoropolymer inner layer provides excellent chemical resistance and impermeability to fluid such as fuel when passed through the tubing. The outer layer which is preferably polyamide provides strength and abrasion resistance to the overall composite tubing. Surface activation of the outer surface of the tubing of fluoropolymer causes the extruded layer of polyamide to adhere to the inner layer of fluoropolymer to give the tubing integrity. While this tubing is useful, it has the disadvantage of requiring two extrusion operations and an intervening surface treatment, and the fluoropolymer tubing has to have sufficient wall thickness, i.e. at least 8 mils (0.2 mm), to be self-supporting until the outer layer of polyamide is applied. This wall thickness is generally thicker than necessary for providing the chemical resistance and impermeability required for the composite tubing.

Example 14 of PCT Publication WO 96/03448, published Feb. 8, 1996, (equivalent to U.S. Pat. No. 5,576,106) discloses coextrusion of polyamide, an adhesive interlayer, and fluoropolymer through a slit die to produce a laminate in one step. The polyamide and fluoropolymer layers of the laminate are each 0.9 mm (35 mils) thick and the interlayer tying these two layers together is 0.2 mm (8 mils) thick. This Example also discloses that by using a cylindrical coextrusion die instead of a slit die, tubular structures can be formed, useful in such applications as fuel hose and tubing in heat exchangers. The adhesive interlayer is a fluoropolymer which has an ethylenically unsaturated compound grafted thereon providing polar functionality to the fluoropolymer of the adhesive interlayer. The fluoropolymer adhesive starts out as a powder and the grafting reaction is carried out only on the surface of the powder. Nevertheless, the polar functionality giving the fluoropolymer its adhesive property survives coextrusion to form the adhesive interlayer tying the fluoropolymer and polyamide layers together. The teaching in this patent publication can prepare automotive fuel line or hose which can be used in place of the product of the '257 patent, but with the advantage of using only one extrusion step. It has the disadvantage, however, of requiring the expense of the adhesive interlayer and an additional extruder for the interlayer.

SUMMARY OF THE INVENTION

The present invention provides a laminate comprising specified fluoropolymer and polyamide layers, which laminate can be formed in a single extrusion step, i.e., by coextrusion, wherein the fluoropolymer layer and the polyamide layer adhere to one another without the presence of an adhesive tie layer.

Thus, the present invention provides a coextruded laminate comprising a layer of fluoropolymer and a layer of polyamide directly adhered to one another, said fluoropolymer being a copolymer of tetrafluoroethylene with perfluorinated comonomer or a copolymer of ethylene with perhalogenated monomer, said polyamide having been adhesively activated to form said coextruded laminate to provide the adhesion between said layer of fluoropolymer and said layer of polyamide.

The laminate can be further characterized by the fluoropolymer layer being a surface layer of the laminate, particularly when the fluoropolymer of this layer is also adhesively activated, i.e. the fluoropolymer layer forms at least one exterior surface of the laminate. When the laminate is in the form of tubing, the adhesively activated fluoropolymer layer can form the interior surface or the exterior surface of the tubing.

By "directly adhered" is meant that there is no intervening tie layer present. It is the adhesive activation of at least one of the polymers forming the layers that causes the adhesion of the layers, one to the other, thereby providing integrity to the laminate without the use of a tie layer.

In one embodiment, the adhesive activation is obtained by incorporating a polymeric additive into the polyamide resin which forms the polyamide layer, the additive having polar functionality and being dispersed as fine particles within the polyamide resin. The polar functionality of the polymeric additive compatibilizes the polymeric additive with respect to the polyamide matrix, whereby the polyamide layer does not lose its strength and/or flexibility. Surprisingly, the additive dispersion in the polyamide matrix constituting the polyamide layer of the coextruded laminate also adheres the polyamide layer to the fluoropolymer layer.

In another embodiment, the fluoropolymer is also adhesively activated by polar-group functionalizing of the fluoropolymer which forms the fluoropolymer layer.

The adhesive activation of the polyamide and fluoropolymer is preferably carried out prior to coextrusion, i.e., prior to the polyamide and the fluoropolymer being fed to their respective extruders.

The laminate of the present invention is made by the process of coextrusion of the polymers described above. This process is another aspect of the invention. The polymers are coextruded as layers directly in contact with one another, so that the resultant adhesion between layers occurs without a tie layer being present, i.e., the coextrusion is carried out in the absence of any tie layer. When the fluoropolymer is adhesively activated, it is extruded as a surface layer for the laminate. In addition to the savings resulting from the absence of any tie layer, when the coextruded laminate is in the form of tubing, the thickness of the fluoropolymer layer can be reduced from the conventional minimum of 8 mils (0.2 mm) to only the thickness needed for chemical resistance and impermeability in particular applications such as fuel hose, e.g. to be less than 8 mils, such as no greater than 7 mils (0.18 mm) in thickness. Surprisingly, the polar functionalizing of the fluoropolymer, when that embodiment is used, does not adversely affect the permeability of the layer to such fluids as gasoline.

BRIEF DESCRIPTION OF THE DRAWING

The FIGURE shows a tracing of the interface between the layers of the tubing made in Example 1 in accordance with the present invention, which tracing is taken from a photograph of a cross-sectional view of the interface provided by Transmission Electron Microscopy.

DETAILED DESCRIPTION

Any polyamide can be used to constitute the polyamide layer of the coextruded laminate. Such polyamide should of course be melt extrudable, and preferably has a number average molecular weight of at least 5000. Examples of polyamides include those made by condensation of equimolar amounts of at least one saturated carboxylic acid containing 4 to 14 carbon atoms with at least one diamine containing 4 to 14 carbon atoms. Excess diamine, however can be used to provide an excess of amine end groups over carboxyl end groups in the polyamide. Specific examples include polyhexamethylene adipamide (66 nylon), polyhexamethylene azelaamide (69 nylon), polyhexamethylene sebacamide (610 nylon), polyhexamethylene dodecanoamide (612 nylon) and polycaprolactam (6 nylon). Aromatic polyamides that are melt extrudable (e.g., aliphatic-aromatic polyamides, as opposed to polyaramids) can also be used in the melt-mixed blends of the present invention. Examples of such semiaromatic polyamides include Amodel® A 1000 and copolymers of 2-methylpentamethylenediamineterephthalate and hexamethyleneterephthalamide such as Zytel® HTN 501 (DuPont). Elastomer-modified versions of such aliphatic and aromatic polyamides can also be used, e.g., Amodel® ET 1000 HSNT (Amoco). Polyamides are well-known in the art. See, for example, Kirk-Othmer, Encyclopedia of Chemical Technology, 4th ed., Vol. 19, p. 454 (1996).

Examples of polymeric additives for the polyamide that adhesively functionalize it include copolymers of ethylene with (meth)acrylic acid which have been at least partially neutralized with metal ions, e.g. Li, Na, K, Mg, Ca, Ba, Sn, Zn, or Al, to form an ionomer as described in U.S. Pat. No. 3,262,272, and ethylene/acrylate copolymers such as ethylene/n-butyl acrylate/glycidyl methacrylate copolymer (EBAGMA) and ethylene/n-butyl acrylate/carbon dioxide copolymer (ENBACO). In the case of these copolymers, the carboxylic acid groups or the salts or esters thereof provide the polar functionality to the polymeric additive by the copolymerization process forming the additive.

Additional polymeric additives include those in which the polymer as made is non-polar but which is then functionalized to become a polar-functionalized polymeric additive useful in the present invention. Examples of such polymers include elastomers such as the well-known ethylene(E)/propylene(P)/diene (EPDM) elastomers, such as E/P/1,4-hexadiene, E/P/dicyclopentadiene, E/P/ 5-ethylidene-2-norbornene copolymers. The polymeric additive may also be a non-elastomeric hydrocarbon polymer such as ethylene polymer, including homopolymer and copolymer. The polymeric additive can be polar functionalized, for example, by grafting of an ethylenically unsaturated compound by conventional processes onto the polymer prior to incorporation of the additive into the polyamide. The compound has polar functionality, whereby the grafting reaction imparts polar functionality to the polymeric additive.

Another example of polymeric additive that can be used to adhesively activate the polyamide is functionalized fluoropolymer such as described below. When polyamide is adhesively activated in this way, the amount of functionalized fluoropolymer is generally in the range of 5–55 wt %, preferably 10–40 wt %, and more preferably 15–30 wt %. Further, when polyamide is adhesively activated in this way, the functionalized fluoropolymer has the same general composition as the fluoropolymer of the fluoropolymer layer of the laminate, or is compatible (miscible) with the fluoropolymer of the fluoropolymer layer.

Examples of polar functionality whether provided by polymerization or grafting include acids, including carboxylic, sulfonic and phosphonic acids, and esters and salts thereof. In the case of compounds for grafting onto and thereby becoming part of the polymeric additive, diacids and anhydrides thereof are preferred. Examples of grafting compounds include maleic anhydride, phthalic anhydride, diethyl maleate, itaconic anhydride, citraconic anhydride, and glutaconic anhydride.

The amount of polymeric additive used in the polyamide can vary widely to provide the strength, flexibility, and/or abrasion resistance desired for the coextruded laminate. It is only desired that the polyamide be the continuous phase (matrix) of the polyamide layer. Generally this will require at least 40 wt % of polyamide based on the combined weight of the polyamide and polymeric additive. The minimum amount of polymeric additive will usually depend on the amount of polar functionality present in the additive. The amount of polar functionality will depend somewhat on whether the polar functionality is obtained by polymerization or by grafting. In the case of polymerization, e.g., of the ethylene copolymers described above, the polar-functional monomer will generally constitute from 5 to 35 wt % of the copolymer forming the polymeric additive. In the case of grafting to form the functionalized polymer additive, the grafting compound will generally constitute 0.1 to 2 wt % based on the weight of the resultant grafted polymer. Thus the minimum amount of polymeric additive used in the polyamide will be that which is effective to provide the direct adhesion of the polyamide layer to the fluoropolymer layer upon coextrusion. At least 0.5 wt % of the polymer additive will usually be required to produce this result.

The adhesion of the polyamide layer to the fluoropolymer layer can be characterized by comparison with the situation when the polyamide and fluoropolymer resins are coextruded and neither polymer is adhesively activated. The resultant laminate simply separates into the individual layers upon the slightest touch. When the coextrusion is in the form of tubing and the fluoropolymer forms the inner layer, the inner layer practically falls out of the outer layer when the tubing is cut in half. In contrast, the adhesion between inner and outer layers in coextruded tubing made in accordance with the present invention is such that the inner layer is integral with the outer layer, even when the tubing is longitudinally cut in half. In that case, the cut composite tubing half can be flexed and even bent at 90 degree angle without the remainder of the inner layer of fluoropolymer delaminating from the remainder of the polyamide outer layer. The same result is obtained when the fluoropolymer forms the outer layer and the polyamide forms the inner layer of the tubing and at least the polyamide of the polyamide layer is adhesively activated in accordance with the present invention.

The polymeric additive can be incorporated into the polyamide resin prior to or during the coextrusion operation, but the polyamide composition will usually be made by Knelt compounding prior to coextrusion so as to obtain a dispersion of fine particles sizes of the polymer additive in the polyamide resin. The particles of the dispersed phase of polymer additive in the polyamide resin matrix can be seen with a scanning electron microscope, and the particle size in this dispersed phase will generally be from 0.01 to 10 micrometers, with smaller sizes, such as 0.1 to 1 micrometer, within this range being preferred for the grafted polymers.

With respect to the fluoropolymer constituting the fluoropolymer layer of the coextruded laminate of the present invention, the fluoropolymers are melt extrudable, such as indicated by a melt viscosity in the range of $0.5 \times 10^3$ to $60 \times 10^3$ Pa·s as normally measured for the particular fluoropolymer. Said fluoropolymers are the copolymers of ethylene with perhalogenated monomers such as tetrafluoroethylene (TFE) or chlorotrifluoroethylene (CTFE), such copolymers being often referred to as ETFE and ECTFE, respectively. In the case of ETFE, minor amounts of additional monomer are commonly used to improve, properties such as reduced high temperature brittleness. Perfluoro (propyl vinyl ether) (PPVE), perfluoro(ethyl vinyl ether) (PEVE), perfluorobutyl ethylene (PFBE), and hexafluoroisobutylene (HFIB) are preferred additional comonomers. ECTFE may also have additional modifying comonomer. Said fluoropolymers are also the copolymers of tetrafluoroethylene with perfluorinated comonomer such as perfluoroolefins containing 3 to 8 carbon atoms and perfluorinated vinyl ether (FVE) of the formula $CF_2=CFOR$ or $CF_2=CFOR'OR$ wherein —R— and —R'— are independently completely fluorinated, linear or branched alkyl and alkylene groups containing 1 to 8 carbon atoms. Preferred R groups contain 1 to 4 carbon atoms. Preferred R' groups contain 2 to 4 carbon atoms. Examples of such perfluorinated copolymers include TFE with HFP and/or PPVE or perfluoro(ethyl vinyl ether). Such fluoropolymers are usually partially-crystalline as indicated by a non-zero heat of fusion associated with a melting endotherm as measured by DSC on first melting, and are considered to be fluoroplastics rather than fluoroelastomers.

The fluoropolymer can be adhesively activated in addition to adhesive activation of the polyamide by having a compound grafted thereto which imparts polar functionality to the fluoropolymer such as described for the grafted fluoropolymer powder in PCT WO 96/03448 wherein the grafting is carried out prior to coextrusion. The amount of grafting compound grafted to the fluoropolymer will vary with the way the polar-grafted fluoropolymer is used. When polar-grafted fluoropolymer is the adhesively activated fluoropolymer of the coextruded laminate, or is used to adhesively activate said fluoropolymer (as in a blend), the amount of grafting compound grafted to the fluoropolymer is generally in the range of 0.01 wt % to 5 wt % based on the total weight of the adhesively activated fluoropolymer. Preferably, the amount of grafted polar-functional compound is 0.02–1 wt %, more preferably 0.04–0.5 wt % based on the total weight of the adhesively activated fluoropolymer. When the polar-grafted fluoropolymer is used to adhesively activate the polyamide, the amount of grafting compound grafted to the fluoropolymer is generally in the range of 0.1 wt % to 5 wt % based on the total weight of the polar-grafted fluoropolymer. Preferably, the amount of grafted polar-functional compound is 0.2–3 wt %, more preferably 0.2–2 wt % based on the total weight of the polar-grafted fluoropolymer. The grafting compounds described above with respect to the polymer additive for the polyamide resin can also be used for grafting onto the fluoropolymer. The fluoropolymer can also be functionalized by copolymerizing polar functional monomer into otherwise non-functional fluoropolymers as described above. Examples of such functional monomers include fluorovinylethers such as $CF_2=CF[OCF_2CF(CF_3)]_m$—O—$(CF_2)_nCH_2OH$ as disclosed in U.S. Pat. No. 4,982,009 and the alcoholic ester $CF_2=CF[OCF_2CF(CF_3)]_m$—O—$(CF_2)_n$—$(CH_2)_p$—O—COR as disclosed in U.S. Pat. No. 5,310,838. Additional fluorovinylethers include $CF_2=CF[OCF_2CF(CF_3)]_mO(CF_2)_nCOOH$ and its carboxylic ester $CF_2=CF[OCF_2CF(CF_3)]_mO(CF_2)_nCOOR$ disclosed in U.S. Pat. No. 4,138,426. In these formulae, m=0–3, n=1–4, p=1–2 and R is methyl or ethyl. Similar functional monomers are disclosed in European Patent Application Publication EP 0 626 424. Other functional monomers include those such as $CH_2=CFCF_2$—Z—$(CH_2)_w$—X wherein X is $CH_2OH$, COOR or epoxy, R is H or alkyl having 1–6 carbon atoms, Z is $R_f$ or $OR_f$, $R_f$ is a fluorine-substituted alkylene group having 1–40 carbon atoms, $R_f$ is $R_f$ or a fluorine-substituted ether group having 3–50 carbon atoms, and w is 0–6 as disclosed in European Patent Application Publication EP 0 728 776. When, the functionalized fluoropolymer is perfluoropolymer (copolymer of tetrafluoroethylene with perfluorinated comonomer) containing a functional comonomer, the amount of functional comonomer is generally no more than 10 wt %, usually 1–10 wt % and preferably no more than 5 wt %, based on total weight of functionalized fluoropolymer, i.e., the fluoropolymer component containing the functional monomer. In this case, the perfluoropolymer can contain a small amount of hydrogen atoms associated with the functionality incorporated into the fluoropolymer. The fluoropolymer can also be adhesively activated by blending functionalized fluoropolymer with non-functionalized fluoropolymer, preferably wherein the fluoropolymers are the same, except for functional units or groups, so as not to jeopardize the impermeability characteristic.

The fluoropolymer and polyamide are coextruded by conventional means except that that the extrusion is carried out so that no appreciable degradation of the lower melting polyamide occurs. This can be accomplished by having the melt temperature of the polyamide relatively cold, with the highest temperature exposure of the polyamide occurring for only a short period of time in the coextrusion crosshead and when the polymers come together as coextruded layers. The heating of the polyamide in the coextrusion crosshead is caused by the fluoropolymer being heated to the higher temperature in its particular extruder feeding the crosshead.

The coextruded laminate in its simplest form consists of two layers, one of functionalized polyamide resin and one of fluoropolymer resin, which may also have been adhesively activated. Such laminate can be used in applications requiring chemical resistance and/or impermeability to organic compounds in the form of liquid or gas, with the fluoropolymer layer being the layer contacting such compounds. The polyamide resin layer provides strength to the overall laminate. When the laminate is in the form of tubing, the interior surface of the tubing can be the fluoropolymer layer to resist the gaseous and/or liquid organic compounds passing through the interior passage of the tubing. The polyamide outer layer provides strength to the tubing. When the tubing is intended for use in conveying a relatively non-corrosive compound through a corrosive atmosphere, then the layers can be reversed, i.e. the polyamide layer constitutes the interior surface and the fluoropolymer layer constitutes the exterior surface. In another embodiment, the polyamide layer can be sandwiched between and directly adhered to two fluoropolymer layers, wherein the adhesive activation of the polyamide layer adheres to both fluoropolymer layers. In this embodiment, both exposed surfaces of the laminate are chemically resistant and gas impermeable, and the polyamide inner layer is protected on both sides.

The following Examples demonstrate a variety of ways to carry out the present invention.

EXAMPLE 1

In this Example, the polyamide layer is adhesively activated by incorporation into the polyamide resin of a polymer additive which is polar-functionalized by grafting.

The polyamide resin is 66-nylon having an inherent viscosity of about 1.25 measured as a solution of 0.5 g of the polymer in 100 ml of m-cresol at 25° C. and having 65–73 eq/$10^6$ g of COOH and 47–53 eq/$10^6$ g of NH2 end groups. The polymer additive is an ethylene/propylene/1,4-hexadiene elastomer (62/32/6) having maleic anhydride grafted to it, the amount of the graft being 0.9 wt % based on the weight of the grafted copolymer. The polymer additive is melt compounded using a twin-screw extruder into the polyamide resin to form a dispersed phase of the additive, wherein the average particle size of the dispersed phase is about 0.5 micrometer (0.013 mm). The resultant composition contains 20% additive based on the weight of the polyamide resin plus the additive. The fluoropolymer resin is a copolymer of ethylene/tetrafluoroethylene/perfluorobutyl ethylene(PFBE), having an E/TFE molar ratio of about 0.9, containing 1 mol % PFBE, and having a melt flow rate of about 7 g/10 min as measured according to ASTM D-3159.

The adhesively activated polyamide composition and the fluoropolymer resin are coextruded under the following conditions: The fluoropolymer is extruded using a 1.0-in (2.54-cm) Davis extruder equipped with a general purpose extrusion screw and operating at a barrel pressure of 410 psig (2.93 MPa) and at a melt temperature of 616° F. (324° C.) entering the coextrusion crosshead to form the inner layer of coextruded tubing. The polyamide resin composition is extruded using a 1.5-in (3.81-cm) Davis extruder equipped with a general purpose screw and operating at a barrel pressure of 600 psig (4.24 MPa) at a melt temperature of 500° F. (260° C.) entering the coextrusion crosshead to form the outer layer of the coextruded tubing. The crosshead die temperature is 580° F. (304° C.) and the extrusion rate is 6.5 ft/min (198 cm/min).

The coextruded tubing is 0.270 in (6.86 mm) in outer diameter and has a wall thickness of 0.055 inch (1.4 mm) of which the fluoropolymer inner layer is 0.006 inch (0.15 mm) thick.

The adhesion of the polyamide layer to the fluoropolymer layer is demonstrated by cutting a length of the tubing longitudinally in half and then flexing and bending the remaining half, with the inner layer remaining adhered to the outer layer.

The experiment is repeated except that no polymer additive is in the polyamide layer. When the coextruded tubing is cut longitudinally in half, the inner layer falls out of the outer layer, indicating the absence of adhesion between these two layers.

The FIGURE shows that the adhesive activation of the polyamide layer can also lead to mechanical engagement between the layers of the coextrudate to supplement the adhesion of the layers together. In the FIGURE, the adhesively activated polyamide layer 2 of this tubing of this Example is bonded to the fluoropolymer layer 4 along an irregular (rough) interface 6 which provides mechanical engagement between the layers as well as the adhesion provided by the dispersion of polymer additive particles (not shown) in the polyamide layer. When the polyamide layer is not adhesively activated as described above, the interlayer between the layers viewed in the same way (by TEM) is smooth, i.e., the layers are not mechanically engaged. Thus, the adhesive activation can promote compatibility between layers to such an extent that the layers tend to merge upon coextrusion. In other experiments, it has been observed that the adhesive activation achieves adhesion even without the presence of mechanical engagement between the layers.

EXAMPLE 2

This Example is directed at adhering coextruded layers of polyamide resin and fluoropolymer resin together by having both the polyamide layer and the fluoropolymer layer functionalized for adhesive activation.

In this Example, polyamide used is 6–12 nylon having an inherent viscosity of 1.4 measured as a solution of 0.5 g of the polymer in 100 ml of m-cresol at 25° C. The 6–12 nylon contains 6.3 wt % of the maleic anhydride grafted EPDM of Example 1. The fluoropolymer resin is the same used in Example 1 except that maleic anhydride had been grafted to it to constitute 0.4 wt % of the resultant resin. The grafting was carried out by exposing a mixture of powdered resin having average particle size of about 100–120 μm (within the preferred range of 50–500 μm disclosed in PCT WO 96/03448) and maleic anhydride powder to ionizing radiation in a closed system to obtain surface-grafted powder, followed by melt extruding the grafted resin to form molding granules for use in the coextrusion process.

The coextrusion conditions are as follows: The extruders used in Example 1 are used in the experiment of this Example for the respective resins. The fluoropolymer melt temperature is 560° F. (293° C.) and barrel pressure is 1200 psig (8.38 MPa), and the polyamide melt temperature is 464° F. (240° C.) and barrel pressure is 225 psig (1.65 MPa). The crosshead die temperature is 580° F. (304° C.), and the extrusion rate and dimensions of the coextruded tubing are the same as in Example 1. When lengths of the coextruded tubing are cut longitudinally in half and flexed and bent, the inner fluoropolymer layer exhibits adhesion to the polyamide outer layer by not separating from the polyamide.

EXAMPLE 3

This Example shows the adhesive activation of the polyamide layer by incorporation (dispersion) of a polar functional polymeric additive into the polyamide, with the polymeric additive being made functional by copolymerization.

The polyamide resin used is the 66-polyamide of Example 1. The polymeric additive is a copolymer of ethylene/methacrylic acid in which the acid comonomer units constitute 10 wt % of the copolymer and in which the acid groups are 71% neutralized with Zn to form an ionomer. The ionomer has a melt index of about 1. The polyamide resin and the ionomer are melt compounded together to form molding granules having the composition 80 wt % polyamide and 20 wt % ionomer dispersed in the polyamide. The fluoropolymer used is the same as in Example 1.

The coextrusion conditions are as follows: The extruder for the polyamide composition is a 1.0-in (2.5-cm) Entwhistle extruder and the extruder for the fluoropolymer is the same extruder as used for the polyamide composition in Example 1. The fluoropolymer melt temperature is 619° F. (326° C.) and the barrel pressure is 170 psig (1.28 MPa), and the polyamide composition melt temperature is 496° F. (258° C.) and barrel pressure is 350 psig (2.485 MPa). The crosshead die temperature is 585° F. (307° C.), and the crosshead has a wider annulus (die opening) for extruding the inner layer of the tubing than used in Example 1. The coextrusion rate is 5.5 ft/min (168 cm/min), the outer diameter of the coextruded tubing is 0.270 in (6.86 mm), and the thickness of the fluoropolymer inner layer is 0.020 in (5.1 mm).

Adhesion between the inner and outer layers of the coextruded tubing is demonstrated by cutting lengths of the tubing longitudinally in half and flexing and bending the resultant half of the tubing. The layers do not separate.

EXAMPLE 4

This Example shows the adhesive activation of the polyamide layer by incorporation (dispersion) of a polar functional fluoropolymer additive into the polyamide, with the polymeric additive being made functional by grafting.

The polyamide resin used is the 66-polyamide of Example 1. The polar functional fluoropolymer additive is the fluoropolymer resin having 0.4 wt % of maleic anydride grafted to it that is used in Example 2. The fluoropolymer additive is melt compounded into the polyamide resin using a twin-screw extruder to form a dispersed phase of the additive, wherein the average particle size of the dispersed phase is about 200 nm. The resultant composition contains 20% additive based on the weight of the polyamide resin and the polar functional fluoropolymer additive. The fluoropolymer resin is the E/TFE/PFBE copolymer of Example 1.

In this instance, the extruders of Example 1 are used for the fluoropolymer resin and the polyamide resin composition, respectively, as in Example 1. The fluoropolymer melt temperature is 615° F. (324° C.), the polyamide resin melt temperature is 500° F. (260° C.), and the crosshead temperature is 580° F. (304° C.). The extrusion rate and dimensions of the coextruded tubing are the same as in Example 1. Adhesion between the inner and outer layers of the coextruded tubing is demonstrated by cutting lengths of the tubing longitudinally in half and flexing and bending a resultant half of the tubing. The layers do not separate, demonstrating the effectiveness of polar functional fluoropolymer additive in adhesively activating the polyamide resin.

What is claimed is:

1. Coextruded laminate comprising a layer of fluoropolymer directly adhered to a layer of polyamide in the absence of any tie layer between said layers, said fluoropolymer being a copolymer of tetrafluoroethylene with perfluorinated comonomer or a copolymer of ethylene with fluorine-containing perhalogenated monomer, at least said polyamide having been adhesively activated to form said coextruded laminate, said layer of fluoropolymer forming a surface of said laminate, wherein the adhesive activation of said polyamide is obtained by said polyamide having a polymeric additive incorporated therein prior to said coextrusion, said additive having polar functionality.

2. The coextruded laminate of claim 1 wherein said polar functionality is anhydride, acid, ester, or salt of said acid, or epoxy.

3. The coextruded laminate of claim 1 wherein said fluoropolymer is adhesively activated.

4. The coextruded laminate of claim 1 in the form of composite tubing.

5. The coextruded tubing of claim 4 wherein the inner layer of said tubing is said layer of fluoropolymer.

6. The coextruded tubing of claim 5 wherein the thickness of said layer of fluropolymer is less than 8 mils.

7. Process comprising coextruding fluoropolymer and polyamide into layers in the absence of any tie layer between said layers so that said layers are in direct contact with one another, said fluoropolymer being a copolymer of tetrafluoroethylene with perfluorinated comonomer or a copolymer of ethylene with fluorine-containing perhalogenated monomer, said polyamide having been adhesively activated so as to adhere said layers to one another, said layer of fluoropolymer forming an exterior surface of the resultant coextruded laminate, wherein the adhesive activation of said polyamide is obtained by said polyamide having a polymeric additive incorporated therein prior to said coextrusion, said additive having polar functionality.

8. Coextruded laminate comprising a layer of fluoropolymer directly adhered to a layer of polyamide, said polyamide of said polyamide layer having been adhesively activated to form said coextruded laminate, said fluoropolymer being a copolymer of tetrafluoroethylene with perfluorinated comonomer or a copolymer of ethylene with fluorine-containing perhalogenated monomer, the adhesive activation of said polyamide being obtained by said polyamide having functionalized fluoropolymer incorporated therein prior to coextrusion to form said laminate.

9. Process comprising coextruding fluoropolymer and polyamide into layers in the absence of any tie layer between said layers so that said layers are in direct contact with one another, said fluoropolymer being a copolymer of tetrafluoroethylene with perfluorinated comonomer or a copolymer of ethylene with fluorine-containing perhalogenated monomer, said polyamide having been adhesively activated so as to adhere said layers to one another, said layer of fluoropolymer forming an exterior surface of the resultant, coextruded laminate, wherein when the adhesive activation of said polyamide is obtained by incorporating functionalized fluoropolymer therein prior to said coextruding.

10. The coextruded laminate of claim 1 wherein said polymeric additive is selected from the group consisting of functionalized fluoropolymer and ionomer.

11. The coextruded laminate of claim 1 wherein said polymeric additive is elastomer, said elastomer having said polar functionality.

* * * * *